United States Patent [19]

Herklotz et al.

[11] 4,432,061

[45] Feb. 14, 1984

[54] SYSTEM FOR CONTROLLING THE VOLTAGE OF AN ELECTROFILTER

[75] Inventors: Helmut Herklotz, Neu Isenburg; Günter Mehler, Frankfurt am Main; Franz Neulinger, Dietzenbach; Helmut Schummer, Heusenstamm; Horst Daar, Erlangen; Walter Schmidt, Uttenreuth; Heinrich Winkler, Neunkirchen, all of Fed. Rep. of Germany

[73] Assignees: Metallgesellschaft Aktiengesellschaft, Frankfurt am Main; Siemens Aktiengesellschaft, Munich, both of Fed. Rep. of Germany

[21] Appl. No.: 261,246

[22] Filed: May 6, 1981

[30] Foreign Application Priority Data

May 8, 1980 [DE] Fed. Rep. of Germany ....... 3017685

[51] Int. Cl.$^3$ ........................ G05B 13/02; B03C 3/68

[52] U.S. Cl. ...................................... 364/480; 55/105; 323/241; 323/903; 364/148

[58] Field of Search .................. 55/105, 139; 323/241, 323/242, 246, 903; 364/148–150, 480, 492

[56] References Cited

U.S. PATENT DOCUMENTS

| | | | |
|---|---|---|---|
| 3,622,839 | 11/1971 | Abrams et al. | 55/105 X |
| 3,893,828 | 7/1975 | Archer | 55/105 X |
| 3,959,715 | 5/1976 | Canning | 55/105 X |
| 4,152,124 | 5/1979 | Davis | 55/105 |
| 4,160,202 | 7/1979 | James et al. | 55/105 X |
| 4,267,502 | 5/1981 | Reese et al. | 55/105 X |
| 4,290,003 | 9/1981 | Lanese | 55/105 X |
| 4,326,860 | 4/1982 | Laugesen | 323/242 X |
| 4,354,152 | 10/1982 | Herklotz et al. | 55/105 X |
| 4,354,860 | 10/1982 | Herklotz et al. | 55/105 |

OTHER PUBLICATIONS

Siemens-Zeitschrift, 1971, No. 9, pp. 567–572.

Goller et al., Elektrofiltersteuering mit direkter Durchbruchserfassung.

*Primary Examiner*—Felix D. Gruber

*Attorney, Agent, or Firm*—Kenyon & Kenyon

[57] ABSTRACT

A system for controlling the voltage of an electrofilter of the type which, after a voltage breakdown, substantially reduces the magnitude of the electrofilter voltage. After a predetermined deionization time, the filter voltage is raised to a new level which is lower than the filter voltage at which the initial voltage breakdown occurred, by a predetermined amount. The filter voltage is subsequently raised in accordance with a predetermined voltage-time function until a further voltage breakdown occurs. The electrofilter voltage is controlled by a microcomputer system in accordance with stored control parameter values. The stored control parameter values are advantageously recalled to control the electrofilter voltage in response to the operating state of a plant in which the electrofilter is employed. In plants wherein a plurality of electrofilters are employed, each such electrofilter is controlled by an associated microcomputer system, the plural microcomputer systems being controlled by a central pilot computer. The central pilot computer of the plant computes strategies which enhance the energy efficiency of the overall electrofilter purification system.

3 Claims, 4 Drawing Figures

SYSTEM FOR CONTROLLING THE VOLTAGE OF AN ELECTROFILTER

BACKGROUND OF THE INVENTION

This invention relates generally to systems for controlling the voltage of electrostatic filters, and more particularly, to a system wherein the filter voltage is decreased by a predetermined amount after a voltage breakdown, the filter voltage being increased in accordance with a predetermined voltage-time characteristic until a further voltage breakdown occurs.

Several known systems for controlling the voltage of an electrofilter are described in Siemens-Zeitschrift, 1971, No. 9, pages 567–572. It is known from the prior art that the effectiveness of an electrofilter in removing particulate matter from a flowing gas increases approximately with the square of the applied DC filter voltage. Accordingly, it is desirable to maintain as a high a DC filter voltage as possible. The filter voltage, however, is limited to a maximum value which corresponds with the dielectric strength of the gas which is being purified. Since the precise composition of the gas and the cleanliness of the electrofilter are continually varying, the breakdown voltage of the electrofilter must be determined empircally. Accordingly, only by causing voltage breakdowns will one know the magnitude of the voltage at which they will occur for a particular system at a particular time. In order to achieve such a sampling of the breakdown voltage limit of the electrofilter, without unduly inhibiting the gas purification function of the electrofilter, the transmission of electrical energy to the filter is discontinued immediately after a voltage breakdown. After a short pause to allow deionization, the filter voltage is quickly raised in accordance with a predetermined voltage-time function to a new level which is lower than the most recently sampled breakdown voltage by a small amount. From this value, the voltage is raised further accordingly to a somewhat slower voltage-time function until a new voltage breakdown occurs. The foregoing sequence is repeated after each such voltage breakdown. As is evident from the foregoing, the frequency of voltage breakdowns depends upon the difference in voltage between the most recent voltage breakdown and the new magnitude to which the voltage is quickly raised, and the voltage gradient of the slower voltage-time function which controls the rate at which the voltage is raised to sample a further voltage breakdown.

In addition to the foregoing, consideration should also be given to the magnitude of the current which flows through the filter because, in many cases, the electrical resistance of the dust in the gas will permit the current rating of the filter to be exceeded before a voltage breakdown occurs. Accordingly, the automatic control system must limit the filter current, the maximum current limit being advantageously adjustable in accordance with operating conditions.

In known control systems for electrical filters, the magnitudes of the breakdown voltage and the maximum current are initially established when the filter is placed in operation, and are not subsequently varied. However, since the operating parameters of a filter must vary in accordance with the overall conditions at an installation in which the electrofilter is operated, it is evident that fixed, predetermined values of the voltage and current values will not lead to the optimization of filter operation. For example, under some circumstances, excessive power is conducted to the electrofilter for a given dust loading of the purified gas.

It is, therefore an object of this invention to provide an electrofilter control system wherein filter operation is optimized in response to changing conditions in an overall installation.

BRIEF SUMMARY OF THE INVENTION

The foregoing and other objects are achieved by this invention which provides an electrofilter control system which controls a plurality of parameters which govern filter operation, in response to operating conditions in an installation where the electrofilter is installed. In this manner, the operation of the filter is adapted to changing operating conditions.

In one embodiment of the invention wherein an electrofilter is electrically coupled to a converter, the operating parameters of the electrofilter are adjusted so that the energy consumed by the electrofilter is not wasted. Such improved efficiency is achieved, in a preferred embodiment of the invention, by a microcomputer control system. In such a microcomputer system, predetermined values of the operating parameters are entered and stored in a memory. The predetermined stored values are recalled by the microcomputer and used to control the operating parameters of the electrofilter.

In embodiments of the invention wherein a plurality of electrofilters are coupled to one another, a microcomputer system is provided for each such electrofilter. The separate microcomputers may be coupled to a main pilot computer which controls the overall filtering process and can calculate optimizing strategies.

BRIEF DESCRIPTION OF THE DRAWINGS

Comprehension of the invention is facilitated by reading the following detailed description in conjunction with the annexed drawings, in which.

DETAILED DESCRIPTION

Figure 1:
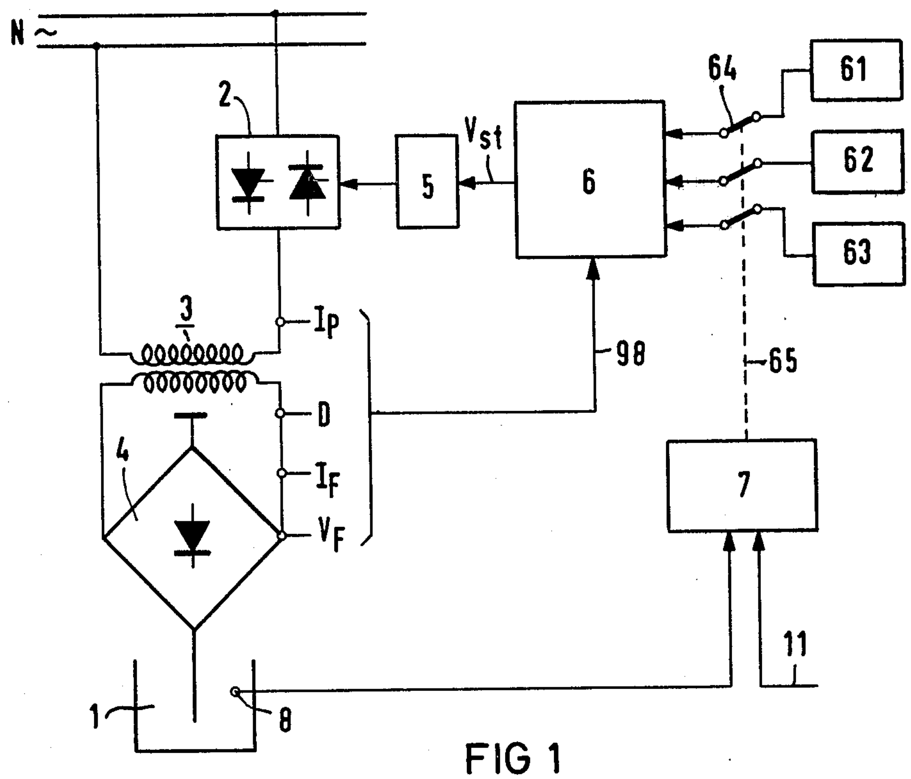
FIG. 1 is a schematic and block and line representation of an electrofilter control system, constructed in accordance with the principles of the invention.

FIG. 1 shows a block and schematic representation of an electrofilter control system having a high voltage rectifier 4 which supplies DC voltage to an electrofilter 1. High voltage rectifier 4 receives electrical energy from an AC network N which is coupled to the high voltage rectifier by a thyristor control element 2 and a high voltage transformer 3. The conductive states of thryistor control element 2 are controlled by a control unit 5 which operates in response to a control voltage $V_{st}$. The control voltage $V_{st}$ is provided at an output terminal of a digital controller 6. Digital controller 6 is provided with a plurality of input terminals for receiving stored and real time data. Real time data corresponding to the magnitude of primary current $I_P$ of high voltage transformer 3, filter current $I_F$, filter voltage $V_F$ and a signal D indicative of a voltage breakdown are conducted to digital controller 6 by an input line 98. A pickup device for sensing a voltage breakdown on the high-voltage side of the system is described in Siemens-Zeitschrift, supra. Alternatively, the voltage breakdown signal may be derived from a comparison of successive half-waves of the pulsating DC filter voltage $V_F$.

As noted, the operating filter voltage is reduced by a predetermined amount after a voltage breakdown occurs. The magnitude of the voltage reduction can be preselected as a percentage k of the total filter voltage. This reduction in filter voltage may be represented as:

$$\Delta V = kV_F$$

where k may be varied, illustratively between 1 and 5 percent.

A plurality of values for the percentage parameter k may be stored in a memory 61 which may be coupled to digital controller 6 by one of a plurality of switches 64.

After the filter voltage $V_F$ is reduced by the predetermined amount $\Delta$ V, the voltage is slowly raised until a next voltage breakdown occurs in accordance with a predetermined voltage-time function having a gradient in time, $\alpha$. A plurality of gradient values are stored in a further memory 62, which is also coupled to digital controller 6 by one of switches 64. Similarly, a plurality of different nominal filter current values $I_{FN}$ are stored in a memory 63. In addition to the foregoing k, gradient, and filter current values, a plurality of other parameter values, such as permissible minimum filter voltages, can be indicated and stored in memory locations (not shown).

Switches 64 are operated by a decoding control unit 7. Thus, switches 64 may be of an electronic type, which are activated by a line 65. The activation of switches 64 is performed in response to a process signal which is conducted to decoding control unit 7 by an input process signal line 11. The process signals on input process signal line 11 may, for example, be indicative of the operating state of the overall installation, including the velocity and moisture content of the gas. Information responsive to the amount of dust loading of electrofilter 1 may be obtained from a dust measuring device 8 which is coupled at its output to an input of decoding control unit 7.

In one embodiment of the invention, decoding control unit 7 is of relatively simple design, illustratively in the form of a decoder which selectively operates predetermined ones of switches 64 in response to information present at input process signal line 11.

Figure 2:
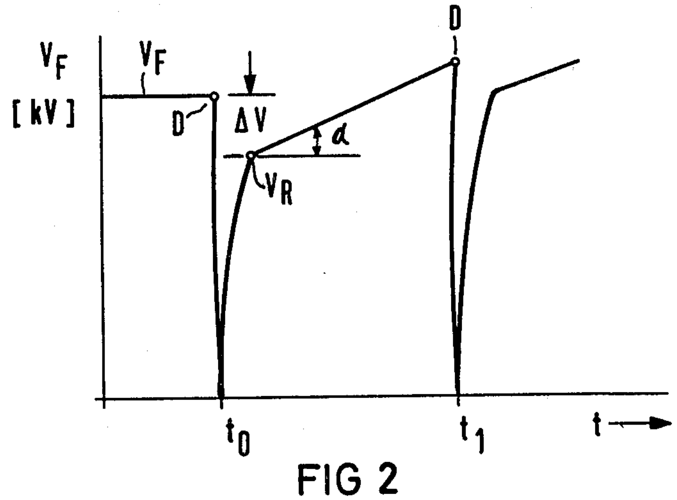
FIG. 2 is an idealized plot of the filter voltage versus time.

FIG. 2 shows an idealized voltage-time wave form of the DC filter $V_F$. As shown, a filter voltage breakdown D occurs at a time $t_0$. In response to this voltage breakdown, the filter voltage is reduced to 0 for a short time, and then, after a short deionization interval, is quickly raised to a new value corresponding to the original filter voltage $V_F$ minus the predetermined reduction voltage $\Delta$ V. From this new reduced filter voltage $V_R$ (where: $V_R = V_F - \Delta V = V_F(1-k)$), the filter voltage is slowly raised in accordance with the predetermined gradient $\alpha$, until a subsequent filter voltage breakdown D occurs at a time $t_1$. The foregoing cycle is repeated after time $t_1$.

Figure 3:
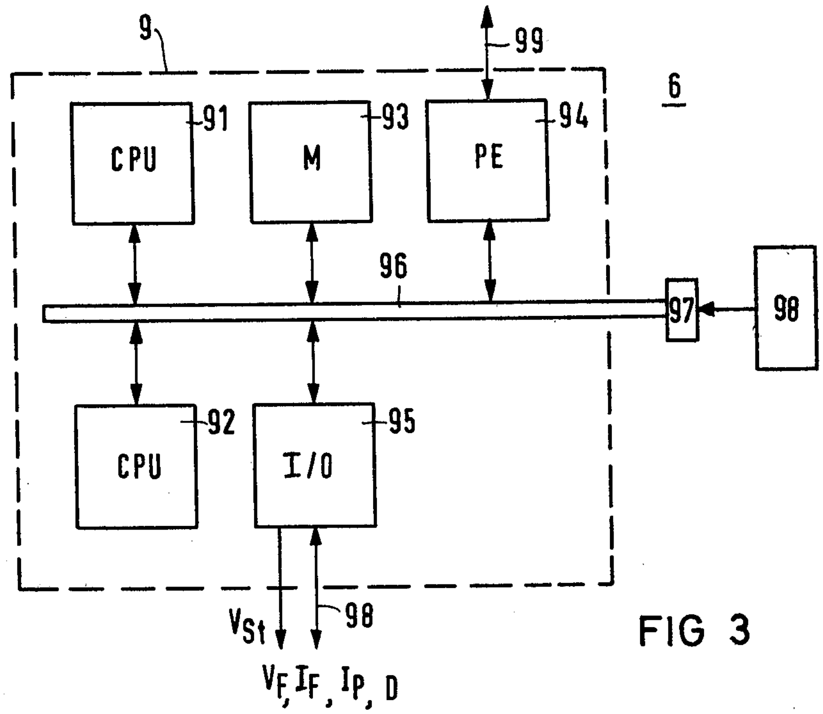
FIG. 3 is a block and line representation of a computerized control system for an electrofilter.

FIG. 3 shows a block and line representation of a digital controller 6 in the form of a microcomputer system 9. As shown in the figure, microcomputer system 9 is provided with two microprocessors 91 and 92; microprocessor 91 being a control microprocessor, and microprocessor 92 being a slave microprocessor. Slave microprocessor 92 processes the received real time data, and senses voltage breakdowns at the filter. Microprocessors 91 and 92 are coupled to a bus 96 which is further coupled to an input/output system 95. Real time data corresponding to $V_F$, $I_F$, $I_P$ and D is entered into microcomputer system 9 by line 98 which is connected to input/output system 95. Control voltage $V_{st}$ is provided at an output of input/output system 95. As shown in FIG. 1, control voltage $V_{st}$ is conducted to control unit 5 which controls the conductive states of thyristor control element 2. Bus 96 is further coupled to a memory 93 and a coupler module 94. Coupler module 94 is connected by a line 99 to a main pilot computer (not shown in this figure).

Upon initiation of the electrofilter control system, microcomputer system 9, which has the same design for all filter installations, receives by means of an input unit 97, the storable parameter values from a programmer 98. In this manner, the operation of individual electrofilters can be customized for particular filter zones.

Figure 4:
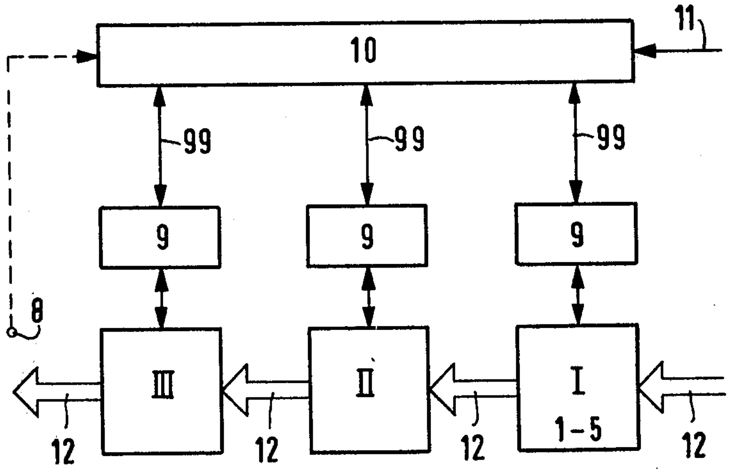
FIG. 4 is a block and line representation of an installation having a plurality of electrofilters, the installation being controlled by a main pilot computer.

FIG. 4 shows a block and line arrangement of an electrofilter installation having a plurality of electrofilter systems I, II and III. A gas 12 to be purified flows successively through the individual electrofilter systems in the direction of the arrows. Each of electrofilter systems I, II and III contains elements 1 through 5 described hereinabove with respect to FIG. 1. Thus, each electrofilter system contains an electrofilter 1, a thyristor control element 2, a high voltage transformer 3, a high voltage rectifier 4, and a control unit 5. In addition, each electrofilter system is provided with an associated microcomputer system 9 which controls the operation of the respectively associated electrofilter system. Each of the associated microcomputer system 9 is coupled to a main pilot computer 10 by a respective bus 99. The pilot computer optimizes strategies for the overall installation, and, depending upon the degree of dust loading determined by a dust measuring device 8 and/or the operating states of the overall installation furnished by means of input process signal line 11, computes parameter values which result in a desired optimum efficiency for the installation. Thus, for example, the overall strategy computed by pilot computer 10 may be such that during periods of low dust production, the power of electrofilter systems I and II can be reduced, and only filter system III operated at full load. This results in substantial energy savings.

The process-dependent signals available at input process signal line 11 may be obtained in response to the operation of machinery and other equipment within the plant which is served by the electrofilter purification system. Thus, the input signal at input process signal line 11 may represent the operating condition of a conveyor in a sintering plant or in a cement plant; temperature variations in a rotary kiln; or the starting up or the shutting down of a cement mill or similar machine. In addition, such signals may include information concerning the temperature of the dust in the gas, the proportion of the gas composition (CO, $H_2$, etc.), the dust content in the raw and purified gases, gas pressure, gas velocity, electrical resistance of the dust and gas mixture, and the moisture content of the gas. In power generating plants, such signals may further include information concerning the amount of electrical load on the plant, the rate of load change, and the type of coal burned (sulphur content). In a garbage combustion plant, such signals may indicate the type of garbage being burned (composition), and the type of supplementary fuel (oil, natural gas or coal).

In addition to the foregoing, many other parameters can be considered. These include: filter current, filter voltage, permissible undervoltage limit, permissible number of voltage breakdowns, gradient of voltage breakdown sampling, amount of filter voltage drop during operation, whether the filter characteristics are to be recorded, information concerning the addition of conditioners such as $SO_3$ and $H_2O$, length of deionization time, duration of the voltage breakdown search periods, and duration of a constant filter voltage prior to resuming sampling for a subsequent voltage breakdown.

Although the invention has been described in terms of specific embodiments and applications, other embodiments, in light of this teaching, would be obvious to persons skilled in the pertinent art. Accordingly, the drawings and descriptions in this disclosure are proffered to illustrate the principles of the invention, and should not be construed to limit the scope thereof.

What is claimed is:

1. A method for controlling the voltage of an electrofilter in a plant, the method having the steps of lowering the filter voltage by a predetermined amount after a voltage breakdown at the electrofilter, and raising the filter voltage in accordance with a predetermined voltage-time function until a further voltage breakdown occurs, the method comprising the further steps of:

storing data corresponding to a plurality of voltage drop factors and a plurality of voltage-time functions prior to performing the step of raising the filter voltage; and controlling the operation of the filter in accordance with said data corresponding to said voltage drop factors and voltage-time functions, said controlling of the filter being performed in response to a selectable one of a plurality of process states of the plant.

2. The method of claim 1 wherein there is provided the step of further storing data corresponding to nominal filter currents, and permissible undervoltages, said data corresponding to said voltage drop factors, voltage-time functions, nominal filter currents, and permissible undervoltages being stored at a point in time corresponding to the initiation of the operation of the filter.

3. A digital arrangement for controlling the voltage of an electrofilter employed in a plant, the arrangement being of the type wherein an electrofilter voltage is lowered by a predetermined amount after a voltage breakdown and thereafter raised in accordance with a predetermined voltage-time function until a subsequent breakdown occurs, the arrangement comprising:

memory means for storing data corresponding to at least a plurality of voltage drop factors and a plurality of voltage-time functions, said data being stored at a point in time corresponding to the initiation of the operation of the electrofilter; and control means responsive to a selectable one of a plurality of process states in the plant for recalling corresponding portions of said data from said memory means.

* * * * *